(12) United States Patent
Holcomb et al.

(10) Patent No.: US 7,337,711 B2
(45) Date of Patent: Mar. 4, 2008

(54) SYSTEM FOR JUICING FRUITS

(75) Inventors: David A. Holcomb, Seattle, WA (US);
Adam A. Jossem, Seattle, WA (US);
John R. Prins, Seattle, WA (US)

(73) Assignee: Chef'n Corporation, Seattle, WA (US)

( * ) Notice: Subject to any disclaimer, the term of this patent is extended or adjusted under 35 U.S.C. 154(b) by 0 days.

(21) Appl. No.: 11/280,083

(22) Filed: Nov. 16, 2005

(65) Prior Publication Data
US 2007/0107608 A1    May 17, 2007

(51) Int. Cl.
*A47J 19/00* (2006.01)
(52) U.S. Cl. .......................................... 99/508; 99/506
(58) Field of Classification Search .......... 99/501–508, 99/496, 497, 495; 100/213, 208; D7/665, D7/678; 220/403, 4.21, 4.26, 625
See application file for complete search history.

(56) References Cited

U.S. PATENT DOCUMENTS

| | | | | |
|---|---|---|---|---|
| 1,702,737 A | * | 2/1929 | MacDonald | 99/508 |
| 4,125,064 A | * | 11/1978 | Ackeret | 99/508 |
| 6,070,519 A | * | 6/2000 | Sham et al. | 99/348 |
| 6,539,848 B2 | * | 4/2003 | Wang et al. | 99/508 |

* cited by examiner

*Primary Examiner*—Timothy F. Simone
(74) *Attorney, Agent, or Firm*—Seed IP Law Group PLLC

(57) ABSTRACT

Devices for extracting and filtering juice from fruit of various sizes and shapes are shown and described. In one particular embodiment, the device has an inner juicing cup, an outer juicing head, and a collection vessel. The inner juicing cup has an inner juicing head. The outer juicing head couples with the inner juicing cup. When coupled together, the outer juicing head encloses the inner juicing head. In addition, the collection vessel couples with the inner juicing cup. In another embodiment, the inner and outer juicing heads have teeth and blades, respectively, of varying degrees of sharpness. In another embodiment, the inner juicing cup has a drainage region for allowing juice to flow into the collection vessel, a first filtering region for filtering juice flowing from the heads to an external container, and a second filtering region for filtering juice flowing from the collection vessel to the external container.

22 Claims, 5 Drawing Sheets

SYSTEM FOR JUICING FRUITS

BACKGROUND OF THE INVENTION

1. Field of the Invention

This invention relates to a system for juicing various fruits.

2. Description of the Related Art

Traditionally, juicers are configured to extract juice from fruit of a specific size or a narrow range of sizes. In addition, conventional juicing heads are typically not designed to optimize juice extraction and minimize user effort, particularly when a user wishes to extract juice from different varieties of fruit of various shapes and sizes. In addition, conventional juicing heads may have a uniform sharpness and/or blade configuration that makes juice extraction inefficient, leaving some juice in the fruit. Furthermore, traditional juicers are typically not designed to provide multiple means of storing, filtering, and dispensing the extracted juice.

3. Brief Summary of the Invention

The present invention is directed toward devices for extracting and filtering juice from a piece of fruit. In one embodiment, the device includes an inner juicing cup, an outer juicing head, and a collection vessel. The inner juicing cup includes an inner juicing head. The outer juicing head is configured to removably couple with the inner juicing cup, and when coupled together, the outer juicing head encloses the inner juicing head. In addition, the collection vessel is configured to removably couple with the inner juicing cup.

In another embodiment, the outer juicing head includes a plurality of blades. Each blade of the outer juicing head has a blade surface having two edges. The width of the blade surface between the two edges varies as the blade surface extends from a base region to a pinnacle region of the outer juicing head. In another embodiment, the two edges of the blade surface proximate to the pinnacle region of the outer juicing head are sharper than the two edges of the blade surface proximate to the base region of the outer juicing head.

In yet another embodiment, the inner juicing head includes a plurality of ridges. Each ridge of the inner juicing head has a ridge surface having two edges. The width of the ridge surface between the two edges varies as the ridge surface extends from a base region to a pinnacle region of the inner juicing head. In another embodiment, the two edges of the ridge surface proximate to the pinnacle region of the inner juicing head are sharper than the two edges of the ridge surface proximate to the base region of the inner juicing head. In a further embodiment, the two edges of the blade surface are sharper than the two edges of the ridge surface.

In yet another embodiment, the outer juicing head includes a plurality of blades for extracting juice from a first set of citrus fruit and the inner juicing head includes a plurality of ridges for extracting juice from a second set of citrus fruit, wherein fruit from the first set of citrus fruit is typically larger than fruit from the second set of citrus fruit. Each blade of the outer juicing head has a blade surface having two edges. The width of the blade surface between the two edges varies as the blade surface extends from a base region to a pinnacle region of the outer juicing head. Each ridge of the inner juicing head has a ridge surface having two edges. The width of the ridge surface between the two edges varies as the ridge surface extends from a base region to a pinnacle region of the inner juicing head.

In another embodiment, the outer juicing head includes a plurality of ridges. Each ridge of the outer juicing head has a ridge surface having two edges. The width of the ridge surface between the two edges varies as the ridge surface extends from a base region to a pinnacle region of the outer juicing head. Furthermore, the inner juicing head includes a plurality of blades. Each blade of the inner juicing head has a blade surface having two edges. The width of the blade surface between the two edges varies as the blade surface extends from a base region to a pinnacle region of the inner juicing head. The two edges of the blade surface are sharper than the two edges of the ridge surface.

In yet another embodiment, the inner juicing cup includes a drainage portion for allowing juice to flow into the collection vessel, and a side portion for coupling to the collection vessel in a removable manner. In another embodiment, the side portion has a first filtering region for filtering juice flowing from the inner and outer juicing heads to an external container. In a further embodiment, the side portion includes a second filtering region for filtering juice flowing from the collection vessel to the external container.

In another embodiment, a device for extracting juice from a piece of fruit includes an inner juicing head and an outer juicing head enclosing and removably coupled to the inner juicing head. The outer juicing head includes a plurality of blades. Each blade of the outer juicing head has a blade surface having two edges. The sharpness of the two edges of the blade surface varies as the blade surface extends from a base region to a pinnacle region of the outer juicing head. The inner juicing head includes a plurality of ridges. Each ridge of the inner juicing head has a ridge surface having two edges. The sharpness of the two edges of the ridge surface varies as the ridge surface extends from a base region to a pinnacle region of the inner juicing head.

The present invention is also directed toward variants thereof and other embodiments of devices for extracting and filtering juice from fruits of various shapes and sizes.

DETAILED DESCRIPTION OF THE INVENTION

Figure 1:
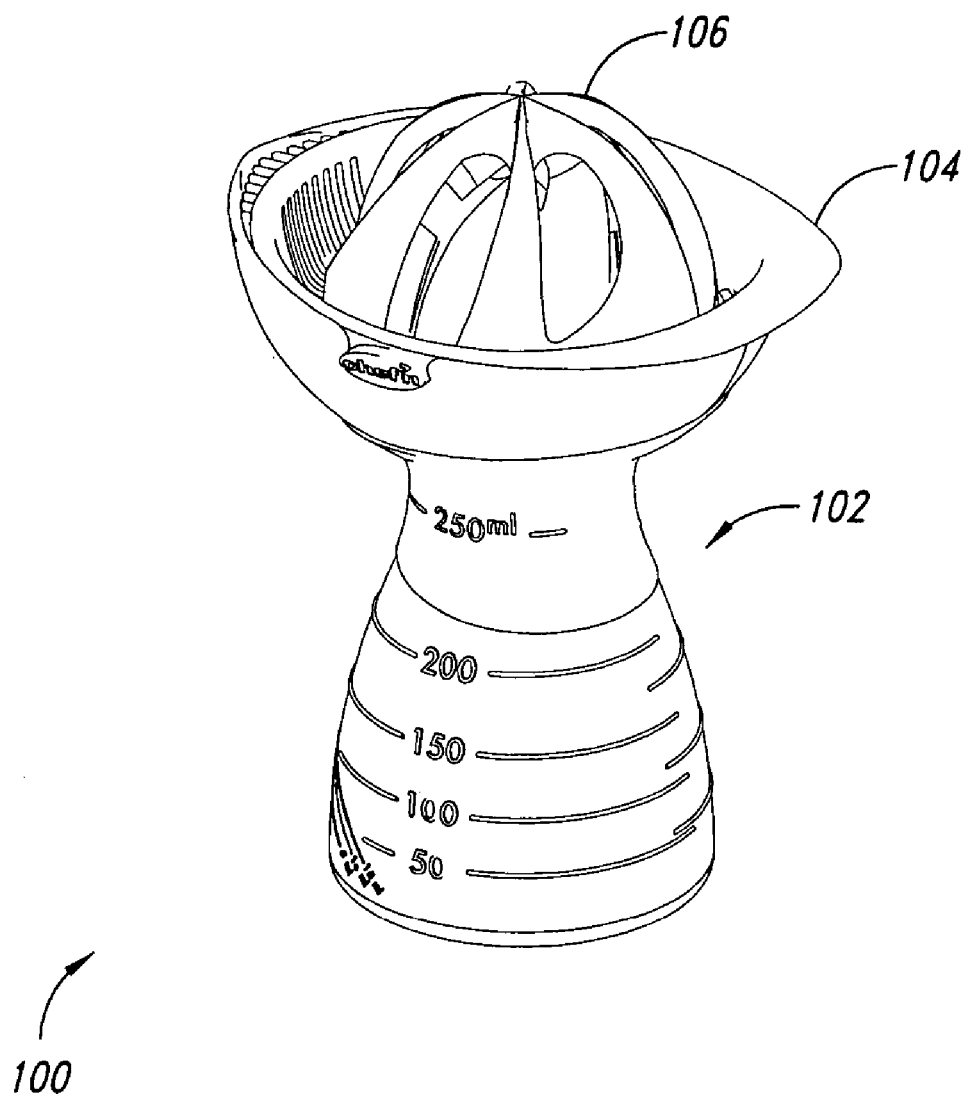
FIG. 1 is an isometric view of a device for juicing a piece of fruit, according to one embodiment of the present invention.

The present detailed description is directed toward a juicing device for extracting and filtering juice from various sized fruits, such as oranges, grapefruits, tangerines, lemons, or limes, for example. The invention could take on other embodiments, and one of ordinary skill in the art, having reviewed the present disclosure and corresponding drawings in their entireties, would readily appreciate modifications that could be made to the illustrated embodiments without deviating from the spirit of the invention. Thus the invention is not to be limited to the specific embodiments illustrated in the drawings and described in connection therewith.

FIG. 1 is an isometric view of a juicing device 100 according to one particular embodiment of the invention. The device 100 includes a collection vessel 102, an inner juicing cup 104, and an outer juicing head 106.

Figure 2:
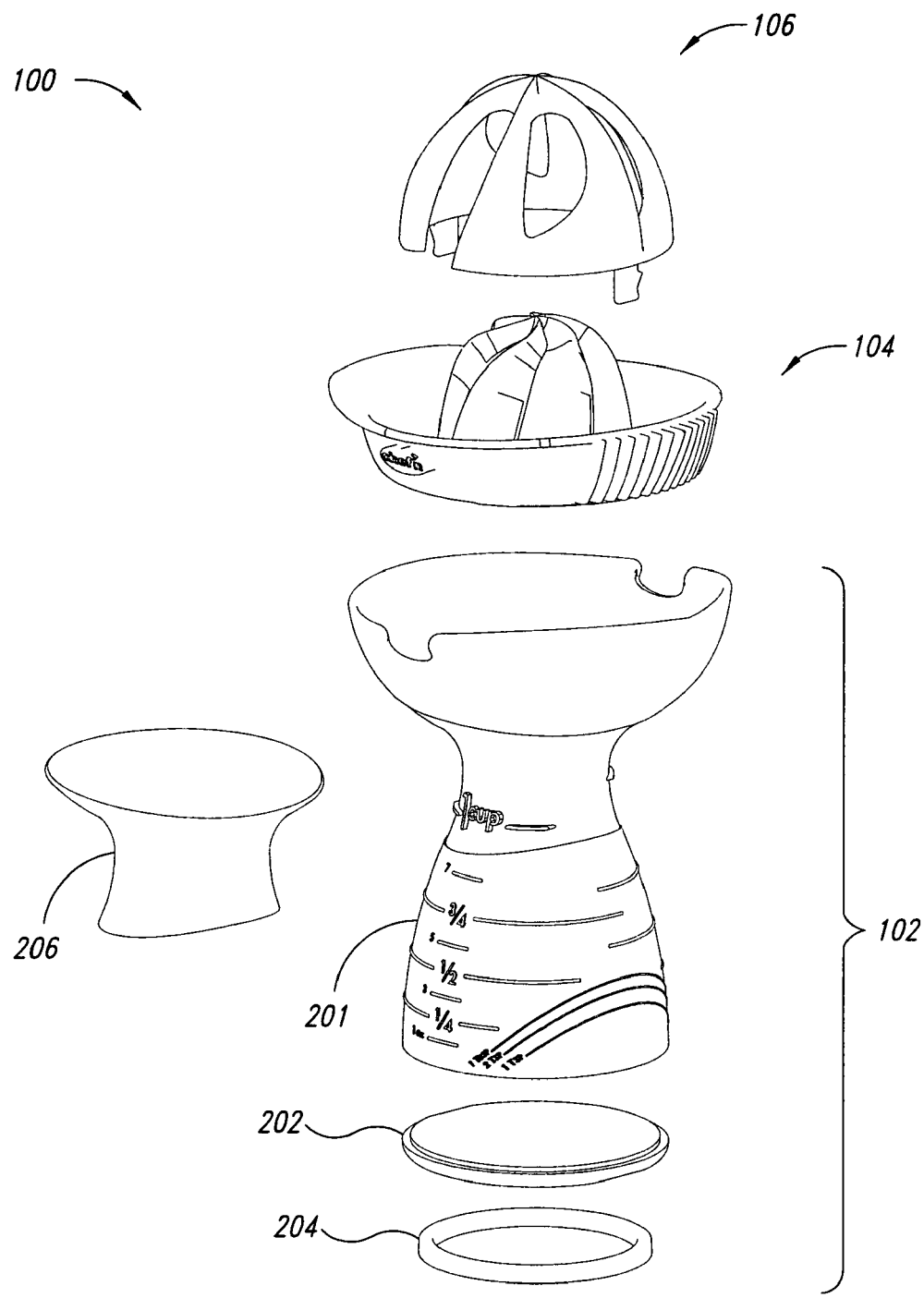
FIG. 2 is an expanded isometric view of the juicing device of FIG. 1, according to one embodiment of the present invention.

FIG. 2 is an expanded isometric view of the juicing device 100 of FIG. 1. In this particular embodiment, the collection vessel 102 includes a body 201, a base 202 and a non-slip base ring 204. The collection vessel 102 may include a gripping pad 206 that encircles a portion of the body 201 as illustrated in FIG. 1. The gripping pad 206 is discussed further below in conjunction with FIG. 3. In one embodiment, the collection vessel 102 is of unitary construction.

Figure 3:
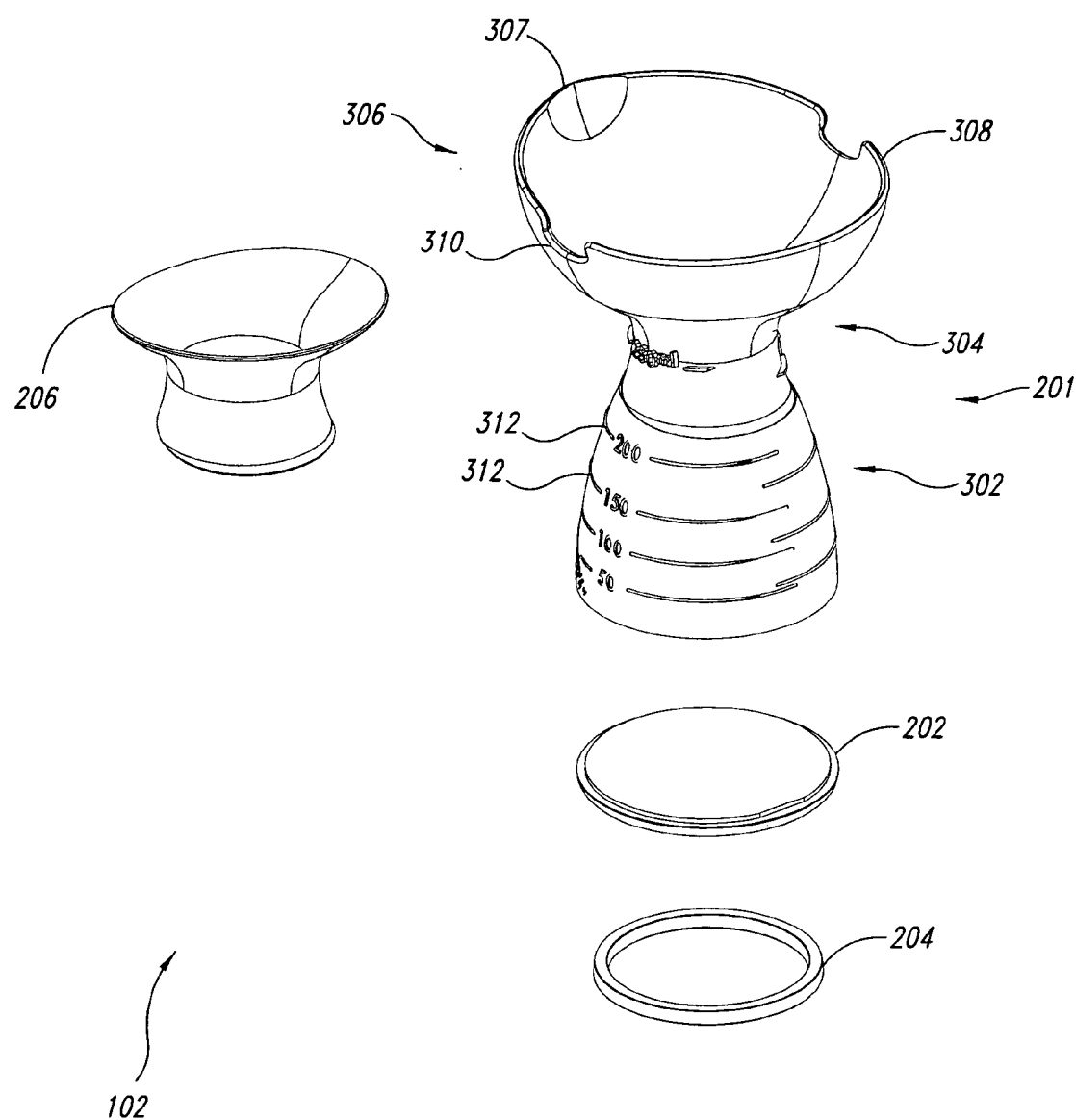
FIG. 3 is an isometric view of the collection vessel of FIG. 2, according to one embodiment of the present invention.

FIG. 3 is an expanded isometric view of the collection vessel 102 of FIG. 2. The collection vessel 102 includes a base portion 302, a neck portion 304, and a mouth portion 306. The illustrated mouth portion 306 is roughly hemispherically-shaped. The mouth portion 306 can include an extended lip 307 (also referred to as a pouring lip) to facilitate pouring juice from the device 100 to an external container (not shown) for consumption or storage. In cross-section, the neck portion 304 is preferably narrower (or has a smaller diameter if the cross-section is approximately circular) than the base portion 302 and the mouth portion 306, to allow a user to comfortably grip the collection vessel 102 when juicing a piece of fruit. Preferably, the gripping pad 206 has non-slip properties to reduce the movement of the collection vessel 102 in a user's hand while the user juices a piece of fruit. In one embodiment of the present invention, the gripping pad 206 is over-molded Silicone that encloses the neck portion 304 and/or a portion of the mouth portion 306. However, one skilled in the art will observe that the collection vessel 102 may include alternate or other gripping means that in the spirit of the present invention allow a user to maintain a grip on the collection vessel 102 while juicing a piece of fruit or when cleaning the device 100. For example, in another embodiment, the gripping pad 206 may be a removable rubber sleeve. In yet another embodiment, the collection device 102 may not include the gripping pad 206.

The base 202 and base ring 204 are designed such that the device 100 is stable when placed upon a surface. An upper edge 308 of the mouth portion 306 has preferably two notches 310 for receiving and coupling with the inner juicing cup 104 (FIG. 2). However, as one skilled in the art will recognize, the upper edge 308 may have fewer or greater number of notches 310, or other suitable features, for securing the inner juicing cup 104 to the mouth portion 306 in a removable manner.

In the embodiment of the collection vessel 102 as illustrated, the base portion 302 and neck portion 304 include graduated volume markings 312 to indicate a volume of juice collected in the collection vessel 102. The scope of the present invention, however, covers a collection vessel 102 having no graduated volume markings, or graduated volume markings on only the base portion 302 or the neck portion 304.

Figure 4:
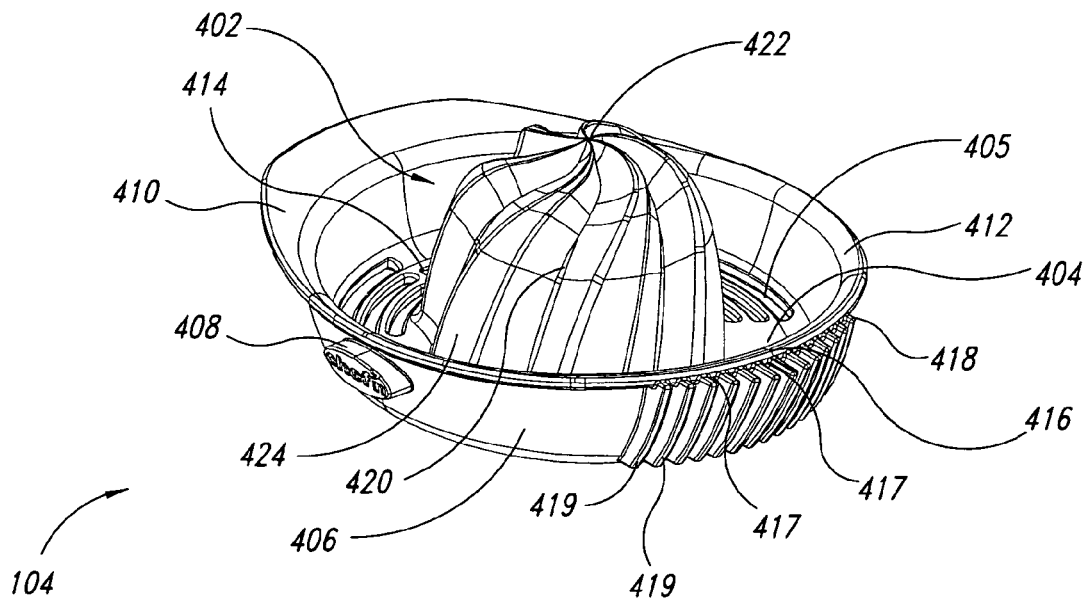
FIG. 4 is an isometric view of the inner juicing cup of FIG. 2, according to one embodiment of the present invention.
Figure 5:
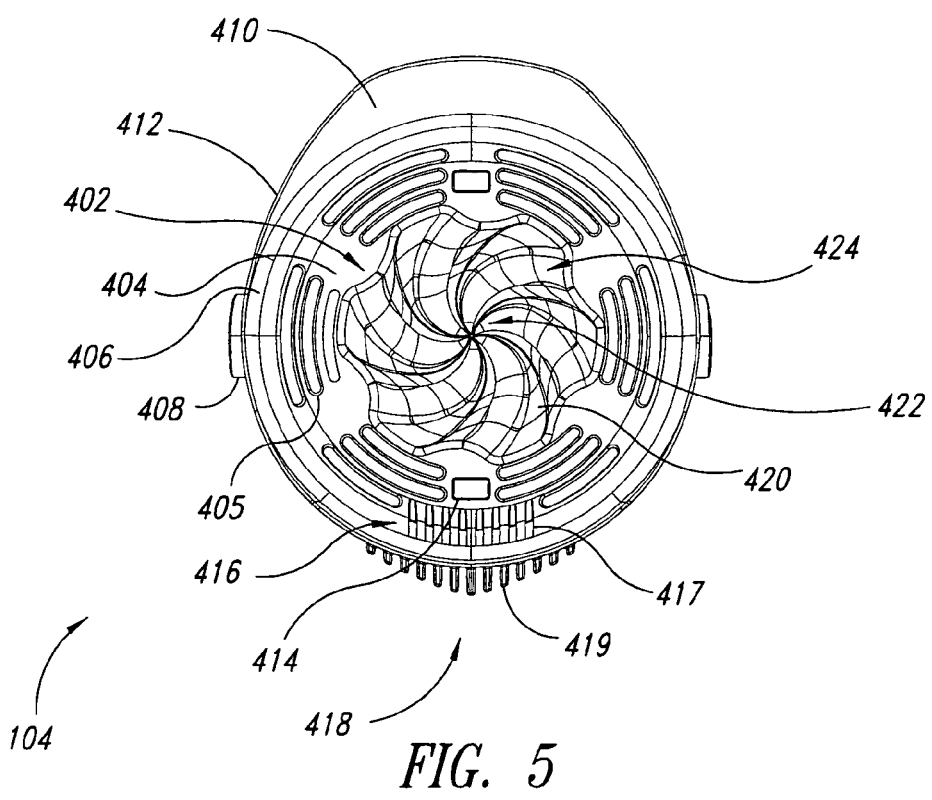
FIG. 5 is a plan view of the inner juicing cup of FIG. 4.

FIGS. 4 and 5 illustrate one particular inner juicing cup 104 according to the present invention. The inner juicing cup 104 includes an inner juicing head 402, a drainage portion 404, and a side portion 406. The drainage portion 404 includes one or more openings 405 to allow juice extracted from a piece of fruit to flow from the inner juicing cup 104 to the collection vessel 102. In one embodiment of the present invention, the openings 405 are a series of curved slots; however, the scope of the present invention includes any number of openings of any size or shape. Since the extracted juice may contain seeds and pulp, the opening(s) 405 may be of various shapes and sizes to facilitate drainage of the juice. For example, in one embodiment of present invention, the openings 405 are configured to allow passage of seeds and pulp into the collection vessel 102. In another embodiment, the openings 405 are designed to allow pulp to pass, but to restrict some or all of the seeds from passing into the collection vessel 102. Furthermore, the drainage portion 404 includes one or more slots 414 for receiving and coupling with the outer juicing head 106 (FIG. 2). Coupling of the outer juicing head 106 to the inner juicing cup 104 via the slots 414 will be discussed further below in conjunction with FIG. 6.

The side portion 406 has one or more tabs 408 for interlocking with the notches 310 (FIG. 3) of the upper edge 308 of the mouth portion 306 of the collection vessel 102. As illustrated, the side portion 406 may include a handle 410 extending partially around an upper edge 412. The handle 410 may be of varying width dependent upon location with respect to the pouring lip 307 (FIG. 3) once the inner juicing cup 104 is locked into position with the collection vessel 102. For example, a portion of the handle 410 located furthest from the pouring lip 307 may be of greater width than a portion of the handle 410 located closer to the pouring lip 307. To secure the inner juicing cup 104 to the collection vessel 102, a user applies a downward force to the inner juicing cup 104 or the tabs 408 to insert the tabs 408 into the notches 310 of the collection vessel 102. The user may apply an upward force to the tabs 408 or the handle 410 to displace the tabs 408 from the notches 310, thereby separating the inner juicing cup 104 from the collection vessel 102.

In the embodiment of the invention as illustrated, the side portion 406 includes a first filtering region 416 and a second filtering region 418. The first filtering region includes one or more elongated openings 417 (also referred to as direct filtering slots) in a segment of the side portion 406 of the inner juicing cup 104. The second filtering region 418 includes fins 419 attached to an outside surface of the side portion 406 (i.e., the surface adjacent to the mouth portion 306 of the collection vessel 102 when the inner juicing cup 104 is coupled to the collection vessel 102). When the inner juicing cup 104 is secured to the collection vessel 102 via the tabs 408 and the notches 310, the filtering regions 416 and 418 are proximate to the pouring lip 307 of the collection vessel 102. The proximity of the first filtering region 416 to the pouring lip 307 allows the freshly extracted juice to flow from the inner and/or outer juicing heads 402 and 106, respectively, through the direct filtering slots 417 of the first filtering region 416, through the fins 419 of the second filtering region 418, and over the pouring lip 307 into a glass (not shown), for example. In operation, a user holds the device 100 in a "tipped" position (i.e., in a position rotated about the z axis (FIG. 1) such that the pouring lip 307 (FIG. 3) is in a lowered position) while rotating a piece of fruit on either the inner juicing head 402 or outer juicing head 106 (FIG. 1). The bulk of the extracted juice does not flow through the opening(s) 405 of the drainage portion 404 when operating the device 100 in such a position, but instead flows directly to the glass via the first filtering region 416.

The proximity of the second filtering region 418 to the pouring lip 307 allows juice to flow from the collection vessel 102, through the spaces between the fins 419 of the second filtering region 418, and over the pouring lip 307 into the glass. The second filtering region 418 allows for a filtering of seeds and/or pulp as a user tilts the device 100 to pour juice stored in the collection vessel 102 into the glass. In the spirit of the present invention, the first and second filtering regions 416 and 418 may include any number of direct filtering slots 417 and fins 419, configured in any number of shapes, sizes and spacing, to allow the device 100 to filter extracted juice in a manner known to one skilled in the art.

In the embodiment as illustrated, the inner juicing head 402 is preferably dome shaped having one or more teeth 420 that assist in juicing the fruit. The teeth 420 may be configured to extend from a top portion 422 (also referred to as a pinnacle) to a base portion 424 of the inner juicing head 402. In one embodiment, the teeth 420 are surfaces bordered by edges that extend in a curved path from the top portion 422 to the base portion 424. The scope of the present invention covers all sizes, shapes and patterns of teeth. Furthermore, the inner juicing head 402 may be shaped spherically, elliptically, or have any other type of curved surface, including additional ridges and grooves (not shown) to facilitate the extraction of juice from various fruits. For example, in another embodiment, the inner juicing head 402 includes sharper-edged ridges (i.e., blades) to facilitate extraction of juice. Various embodiments of the present invention cover ridges and blades of varying degrees of sharpness. In some embodiments, the sharpness of a blade or ridge may vary along the extension of the blade or ridge from the top portion 422 to the base portion 424 of the inner juicing head 402.

In one embodiment of the present invention, the inner juicing cup 104 is of unitary construction. However, as one of skill in the art will recognize, the tabs 408 and/or the fins 419 may be injected over-molded onto the side portion 406 of the inner juicing cup 104.

Figure 6:
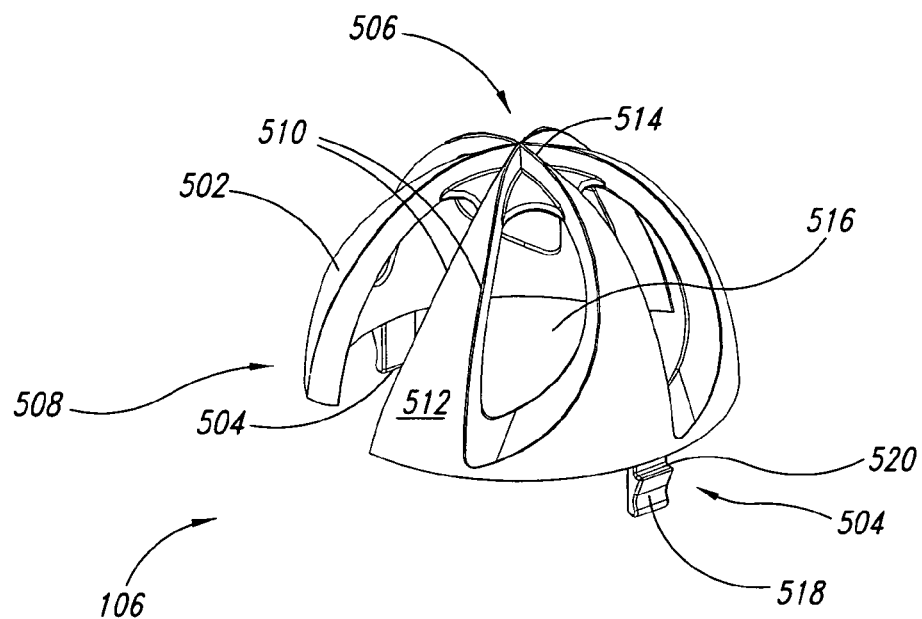
FIG. 6 is an isometric view of the outer juicing head of FIG. 2, according to one embodiment of the present invention.
Figure 7:
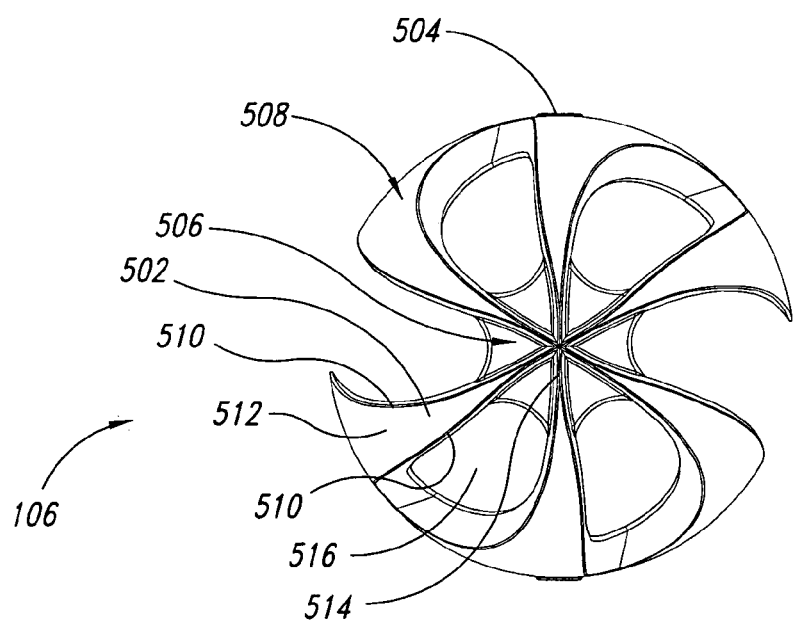
FIG. 7 is a plan view of the outer juicing head of FIG. 6.

FIGS. 6 and 7 illustrate one particular outer juicing head 106 according to the present invention. Preferably, the illustrated outer juicing head 106 is of unitary construction and includes a plurality of blades 502 for extracting juice from a piece of fruit. Furthermore, in the embodiment as illustrated, the outer juicing head 106 preferably includes two clips 504 for interlocking with the slots 414 (FIG. 4) to secure the outer juicing head 106 to the inner juicing cup 104. However, the scope of the present invention covers embodiments of the outer juicing head 106 with a lesser or greater number of clips 504 or other suitable fasteners.

The blades 502 join together at a pinnacle portion 506 of the outer juicing head 106 and may or may not be joined together at a base portion 508. In the embodiment as illustrated, a width of a blade 502 narrows as the blade extends in a curved manner from the base portion 508 to the pinnacle portion 506. As illustrated, the blade 502 has two edges 510 that define the borders of a blade surface 512. The two edges merge into one edge 514 proximate to the pinnacle portion 506. In one embodiment, the two edges 510 may have a sharpness that varies along the length of the blade 502. In another embodiment, the two edges 510 do not merge into one edge, but remain separated by a narrow region of blade surface. As illustrated, adjacent blades are joined together at the pinnacle portion 506 and separated from each other by an opening 516. The opening 516 facilitates the passage of extracted pulp and juice to the drainage portion 404 (FIG. 4) of the inner juicing cup 104.

In the embodiment of the invention as illustrated, the two clips 504 are located near the base portion 508. In one embodiment of the present invention, the clips 504 have a curved outer surface 518 and a notched portion 520 for removably securing the outer juicing head 106 to the inner juicing cup 104. For example, a user inserts the clips 504 into the slots 414 (FIG. 4) located in the drainage portion 404 of the inner juicing cup 104. Once the clips 504 are inserted fully through the slots 414, the notched portion 520 secures the outer juicing head 106 to the inner juicing cup 104. In order to separate the inner juicing cup 104 from the outer juicing head 106, the user presses inward on the clips 504 to enable the notched portions 520 of each clip 504 to pass through the slots 414.

Each U.S. patent, U.S. patent application publication, U.S. patent application, foreign patent, foreign patent application and non-patent publication referred to in this specification and/or listed in the Application Data Sheet, if any, is incorporated herein by reference, in its entirety.

The invention claimed is:

1. A device for extracting juice from a piece of fruit, the device comprising:
   an inner juicing cup, the inner juicing cup including an inner juicing head; and
   an outer juicing head configured to be removably coupled to the inner juicing cup, the outer juicing head enclosing at least a portion of the inner juicing head when coupled to the inner juicing cup and including a plurality of blades, a blade of the plurality of blades including a blade surface having two edges, a width of the blade surface between the two edges varying from a base portion of the outer juicing head to a pinnacle portion of the outer juicing head.

2. The device of claim 1, further comprising a collection vessel configured to be removably coupled to the inner juicing cup.

3. The device of claim 2 wherein the inner juicing cup further comprises:
   a drainage portion adapted for allowing juice to flow into the collection vessel; and
   a side portion configured to be removably coupled to the collection vessel.

4. The device of claim 3 wherein the side portion comprises a first filtering region for filtering juice flowing from the inner juicing head and outer juicing head to an external container.

5. The device of claim 4 wherein the first filtering region comprises one or more slots.

6. The device of claim 3 wherein the side portion comprises a second filtering region for filtering juice flowing from the collection vessel to an external container.

7. The device of claim 6 wherein the second filtering region comprises a plurality of fins.

8. The device of claim 7 wherein the collection vessel comprises a pouring lip, the plurality of fins extending from the side portion of the inner juicing cup to the pouring lip.

9. The device of claim 2 wherein the inner juicing cup further comprises:
   drainage means for allowing juice to flow from the inner juicing head and outer juicing head to the collection vessel;
   first filtering means for filtering juice flowing from the inner juicing head and outer juicing head to an external container; and
   second filtering means for filtering juice flowing from the collection vessel to the external container.

10. The device of claim 9 wherein the drainage means further comprises third filtering means adapted for filtering juice flowing from the inner juicing head and outer juicing head to the collection vessel.

11. The device of claim 1 wherein the width of the blade surface near the pinnacle portion is smaller than the width of the blade surface near the base portion such that the two edges merge into one edge near the pinnacle portion.

12. The device of claim 1 wherein a sharpness of the two edges of the blade surface vary from the base portion to the pinnacle portion, the sharpness of the two edges near the pinnacle portion being greater than the sharpness of the two edges near the base portion.

13. The device of claim 1 wherein the outer juicing head further comprises a series of openings between adjacent blades of the plurality of blades.

14. The device of claim 1 wherein:
the plurality of blades of the outer juicing head are configured for extracting juice from a first set of citrus fruit; and
the inner juicing head comprises a plurality of ridges for extracting juice from a second set of citrus fruit, a ridge of the plurality of ridges including a ridge surface having two edges, a width of the ridge surface between the two edges varying from a base portion of the inner juicing head to a pinnacle portion of the inner juicing head, a fruit from the first set of citrus fruit typically larger than a fruit from the second set of citrus fruit.

15. The device of claim 14 wherein the two edges of the blade surface are sharper than the two edges of the ridge surface.

16. The device of claim 1 wherein the inner juicing head comprises a plurality of teeth, a tooth of the plurality of teeth including a tooth surface having two edges, a width of the tooth surface between the two edges varying from a base portion of the inner juicing head to a pinnacle portion of the inner juicing head, the two edges of the blade surface being sharper than the two edges of the tooth surface.

17. The device of claim 1 wherein the inner juicing head comprises a plurality of teeth, a tooth of the plurality of teeth including a tooth surface having two edges, a width of the tooth surface between the two edges varying from a base portion of the inner juicing head to a pinnacle portion of the inner juicing head, the two edges of the tooth surface being sharper than the two edges of the blade surface.

18. The device of claim 1 wherein:
the plurality of blades of the outer juicing head are configured for extracting juice from a first set of citrus fruit; and
the inner juicing head comprises a means for extracting juice from a second set of citrus fruit, fruit from the first set of citrus fruit typically being larger than fruit from the second set of citrus fruit.

19. A device for extracting juice from a piece of fruit, the device comprising:
an inner juicing head, the inner juicing head including a plurality of teeth, a tooth of the plurality of teeth having a tooth surface having two edges, a sharpness of the two edges of the tooth surface varying from a base portion of the inner juicing head to a pinnacle portion of the inner juicing head; and
an outer juicing head enclosing and removably coupled to the inner juicing head, the outer juicing head including a plurality of blades, a blade of the plurality of blades having a blade surface having two edges, a sharpness of the two edges of the blade surface varying from a base portion of the outer juicing head to a pinnacle portion of the outer juicing head.

20. The device of claim 19 wherein the sharpness of the two edges of the blade surface is greater than the sharpness of the two edges of the tooth surface.

21. A device for extracting juice from a piece of fruit, the device comprising:
an inner juicing cup, the inner juicing cup including an inner juicing head having a pinnacle portion and a base portion; and
an outer juicing head having a pinnacle portion and a base portion, the outer juicing head being configured to be removably coupled to the inner juicing cup, the outer juicing head enclosing at least a portion of the inner juicing head when coupled to the inner juicing cup and including a plurality of blades, a blade of the plurality of blades including a blade surface having two edges, the blade surface extending in a curved path from a base portion of the outer juicing head to a pinnacle portion of the outer juicing head.

22. The device of claim 21 wherein the inner juicing head includes a plurality of blades, a blade of the plurality of blades including a blade surface being bounded by two edges that extend in a curved path from the base portion of the inner juicing head to the pinnacle portion of the inner juicing head.

* * * * *